March 12, 1946. F. R. McBERTY 2,396,332
RELAY CONSTRUCTION
Filed July 29, 1940 6 Sheets-Sheet 1
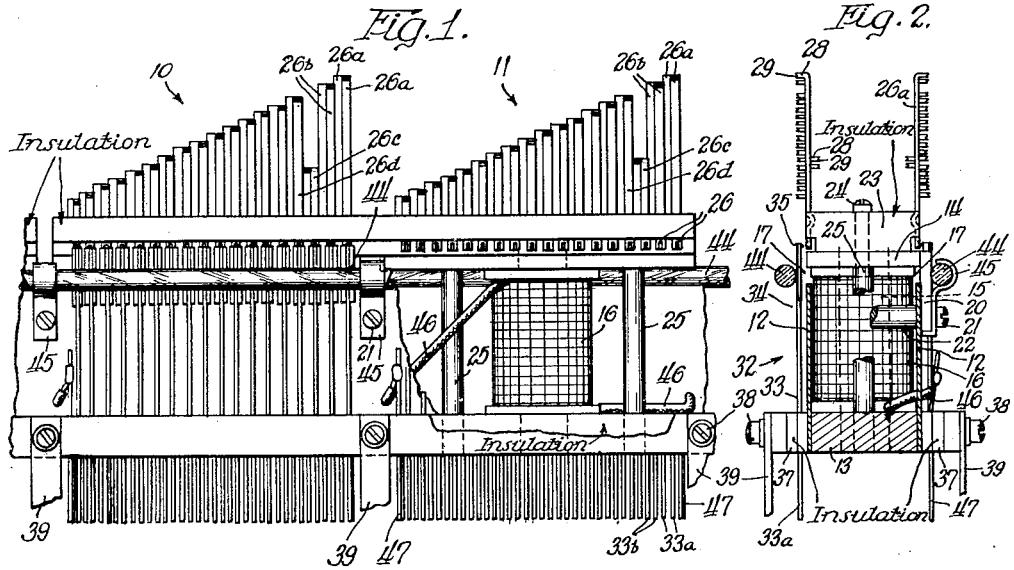
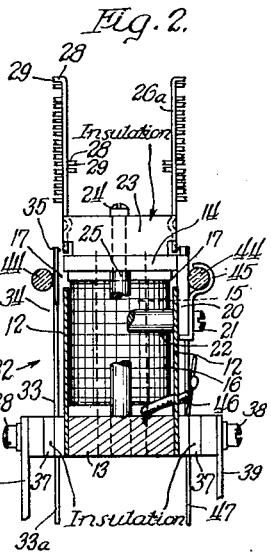
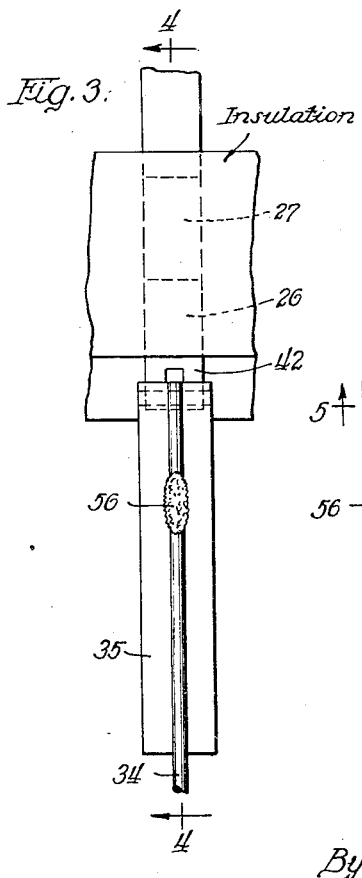
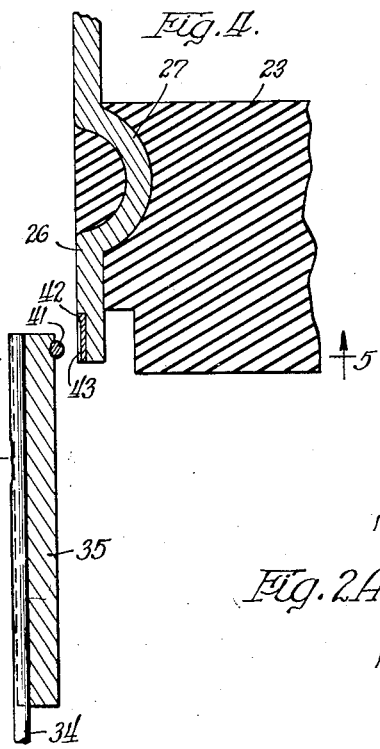
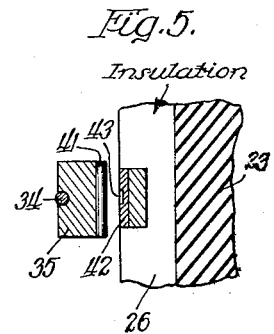
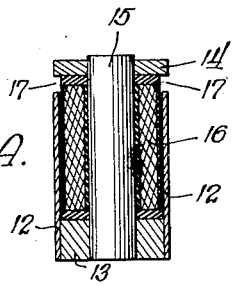
Inventor:
Frank R. McBerty.

March 12, 1946.   F. R. McBERTY   2,396,332
RELAY CONSTRUCTION
Filed July 29, 1940   6 Sheets-Sheet 2
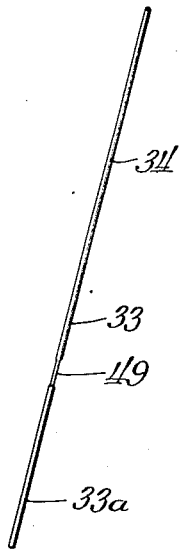
Fig. 6.
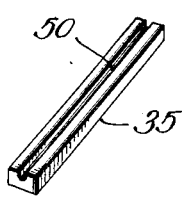
Fig. 7.
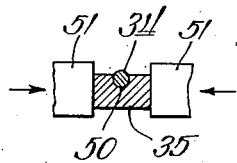
Fig. 8.
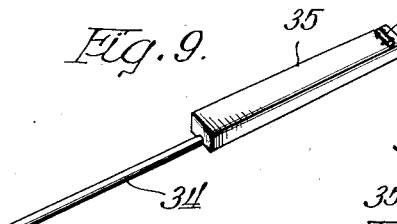
Fig. 9.   Fig. 10.
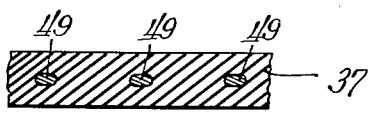
Fig. 12.
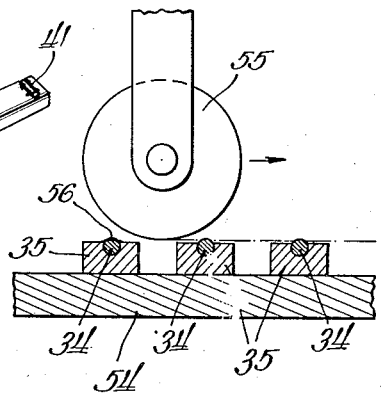
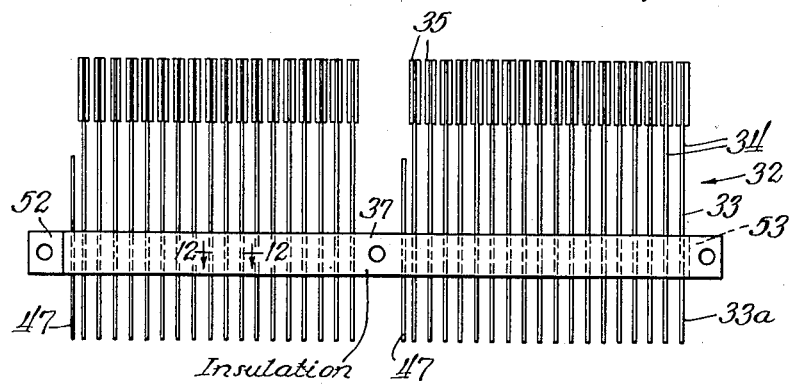
Fig. 11.
Inventor:
Frank R. McBerty.
By
Brown, Jackson, Boettcher & Dienner
Attys.

Inventor
Frank R. McBerty

March 12, 1946.  F. R. McBERTY  2,396,332
RELAY CONSTRUCTION
Filed July 29, 1940   6 Sheets-Sheet 4
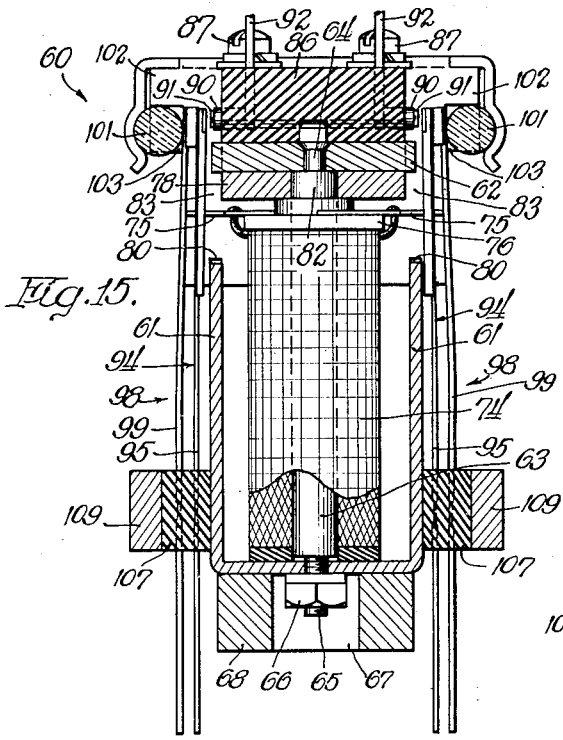
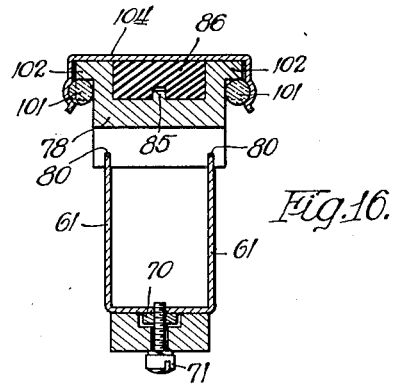
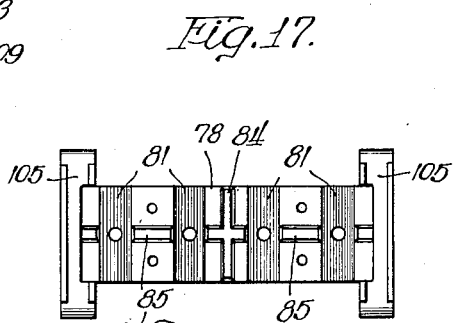
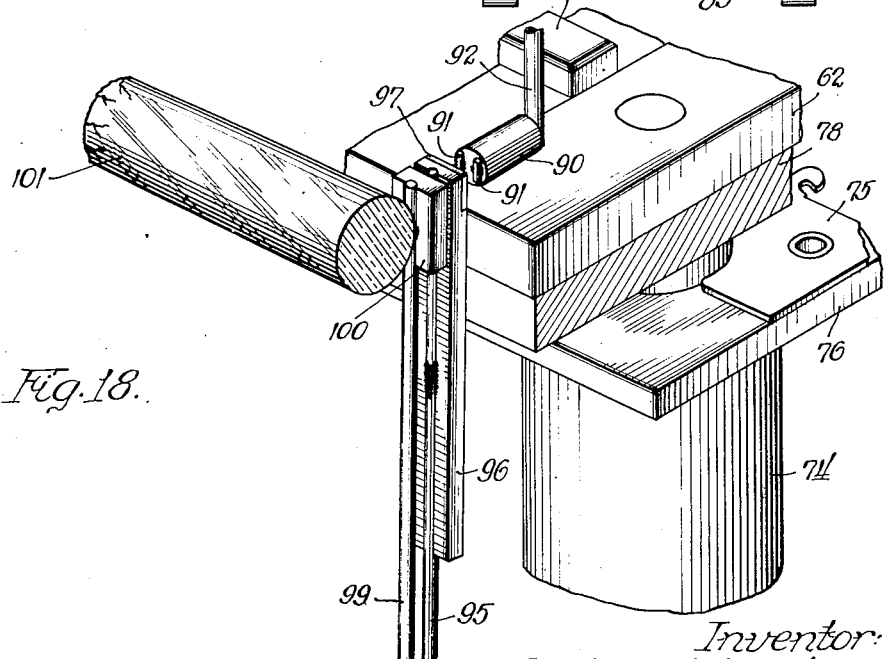
Inventor:
Frank R. McBerty.

Inventor:
Frank R. McBerty.

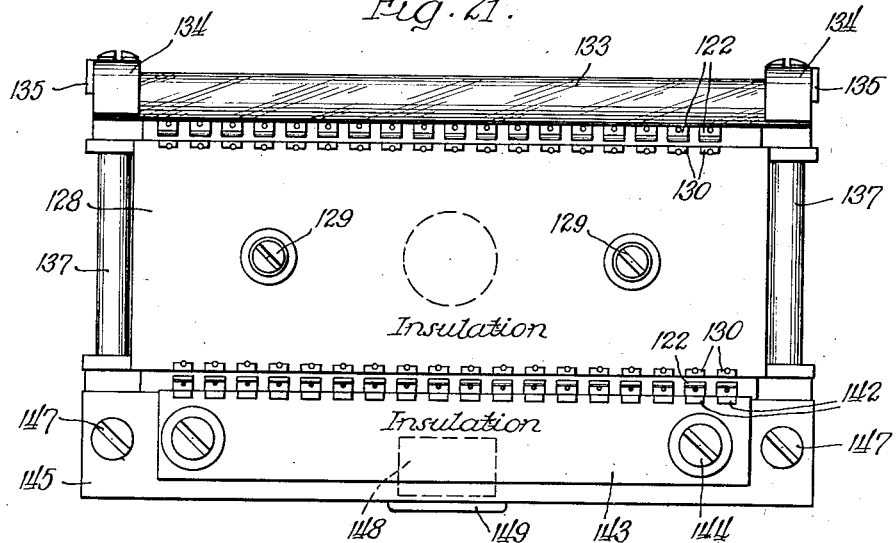
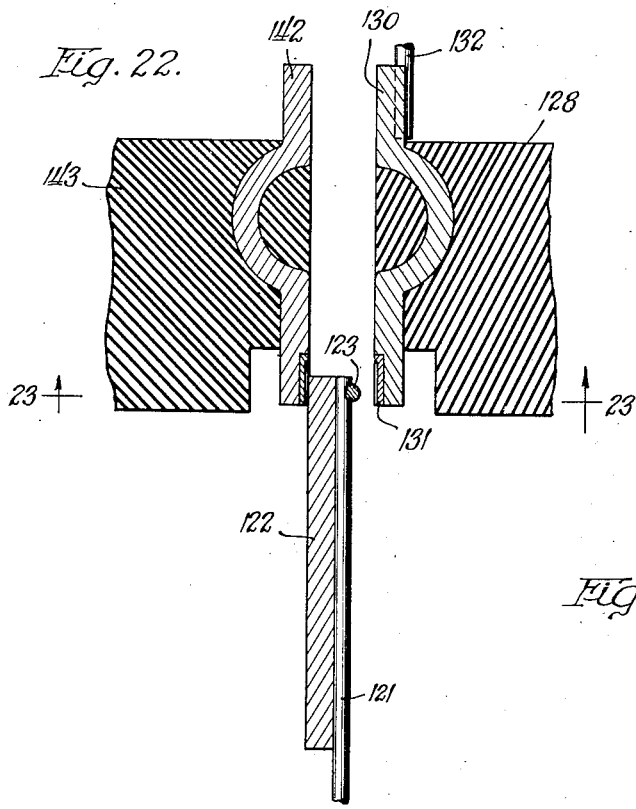
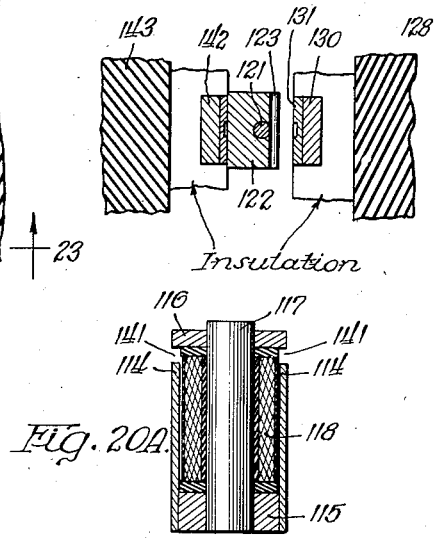
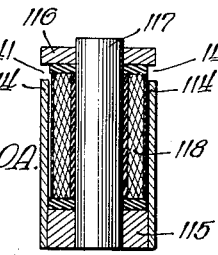

Patented Mar. 12, 1946

2,396,332

UNITED STATES PATENT OFFICE 2,396,332

RELAY CONSTRUCTION

Frank R. McBerty, Mansfield, Ohio, assignor to The North Electric Manufacturing Company, Galion, Ohio, a corporation of Ohio Application July 29, 1940, Serial No. 348,222

21 Claims. (Cl. 200—104)

My invention concerns automatic electric telephone exchange systems and like selective appliances, and its object is to eliminate or reduce various undesirable or destructive features commonly found in all such systems heretofore designed, or found in commercial use.

The various limitations, costs, defects and failures of automatic exchanges are well known and throughout many years have been the objects of much study, research and invention. They concern the volume and cost of the equipment and its housing, the inadequate speed of operation, electrical interference with or disturbance of the voice currents arising within the switching structure, the power and the destructive effects of its operation, deterioration during the life of many years of uninterrupted operation, changes of structure resulting from abrasion, deformation, stress, corrosion, loss of insulation, changes of speed and timing of movement of parts.

During the life of the equipment, the various factors of change and deterioration require attendance, inspection and test, replacement, repair, adjustment and ultimately total replacement for inoperativeness rather than substitution of radically improved structures. Having in mind these limitations and defects, I have aimed to produce an automatic central-office exchange equipment, compact, unchanging within the limits of necessary operation, durable, simple, utilizing small forces, parts of minimum mass, incapable of adjustment; and have thereby attained speed of action, freedom from internal electrical disturbance and destructive effects, the exclusion of attendance, inspecting, testing, adjusting, and repair to a degree not heretofore found in any type of automatic exchange. The compact character permits reduced housing space and cost, combined with reduced hazard of damage; the exclusion of attendance reduces the cost of operation, the hazard of unskilled handling, tampering and sabotage.

To this end, my invention comprises certain new types of electro-magnetic switching devices, certain wiring structures for interconnecting the parts, new forms and compositions of material, and certain methods of utilizing the several materials and producing the desired structures as hereinafter described.

For a more complete understanding of the nature and scope of my invention, reference may be had to the following detailed description taken in connection with the accompanying drawings, in which:

Figure 1 is a view, in side elevation, certain parts having been broken away to more clearly show the details of construction, illustrating one embodiment of my improved relay construction assembled as a part of a line finder or connector link of an automatic telephone exchange of the relay type;

Figure 2 is an end view of the construction shown in Figure 1, certain parts being shown in section;

Figure 2A is a sectional view, similar to Figure 2, showing in more detail the arrangement of the magnetic circuit;

Figure 3 is a plan view, at an enlarged scale, showing the arrangement of one set of movable and stationary contact members;

Figure 4 is a longitudinal sectional view taken along the line 4—4 of Figure 3;

Figure 5 is a detail sectional view taken along the line 5—5 of Figure 4;

Figures 6 through 10 illustrate different steps in the manufacture of a contact finger for my improved relay construction;

Figure 11 is a plan view of a bank of movable contact members, two sets being shown, each set being arranged to be individual to a relay;

Figure 12 is a detail sectional view, at an enlarged scale, taken along the line 12—12 of Figure 11;

Figure 15 is a detail sectional view taken along the line 15—15 of Figure 14;

Figure 16 is a detail sectional view, at a reduced scale, taken along the line 16—16 of Figure 13;

Figure 17 is a top plan view of a frame member which is employed in the relay construction as shown in Figures 13 and 14;

Figure 18 is a perspective view, at an enlarged scale, showing the details of arrangement of the contact members for the relay construction shown in Figures 13 and 14;

Figure 20A is a sectional view, similar to Figure 20, showing in more detail the arrangement of certain parts of the magnetic circuit;

Figure 21 is a top plan view of the relay construction shown in Figure 19;

Figure 22 is a detail sectional view, at an enlarged scale, showing the arrangement of the break and make contact members for the relay construction as shown in Figures 19, 20 and 21; and Figure 23 is a detail sectional view taken along the line 23—23 of Figure 22.

Figure 13:
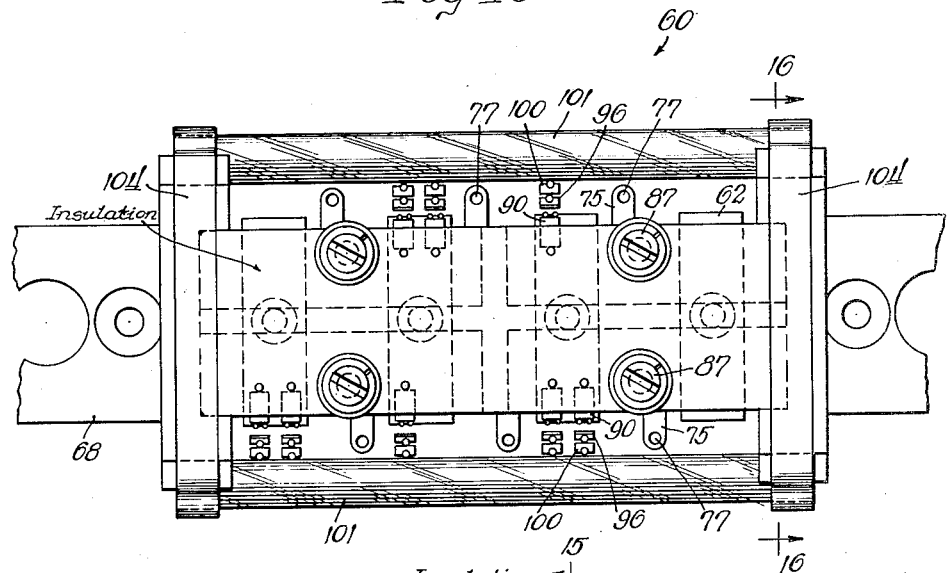
Figure 13 is a top plan view of another embodiment of my invention.

Referring now particularly to Figures 1 and 2 of the drawings, it will be observed that the reference characters 10 and 11 each designate, generally, a relay construction. Each of these relay constructions may comprise what is known in the telephone art as a tens relay, ten of which are mounted in alignment to provide the tens relay of a line finder or connector link, as is disclosed in more detail in my copending application Serial No. 348,223, filed July 29, 1940. Since the construction of the relays 10 and 11 is identical, only one of them will be described in detail herein.

These relays are designed for use in connection with the type of automatic selective system for automatic telephone exchanges known as the "All-Relay" System, of which the selective structure and its mode of operation are described in "Telephone Theory and Practice" by Kempster B. Miller, First Edition, 1933, Chapter VI. The mode of selection, which consists in first selecting from a large number of lines a fractional group of lines and then selecting from the fractional group a single line, has come to be known as the "factorial" selection; the selections performed in sequence by serially performing selections of numbers which multiplied together produce the total number of lines from which selection is to be performed. The common "factorial" selection is ordinarily made in accordance with the decimal system, a selection of one group of ten lines in ten groups of ten lines in one hundred being followed by selection of one line within a designated ten. Obviously, the number of lines on which the selection may be performed might be a number different from one hundred, operating upon different factors; for example, such as one hundred forty-four lines within which selection of twelve lines of twelve groups is made, followed by one line in the wanted group of twelve, or even followed by a selection of four groups of three lines each, followed by a selection of one line in three. It is to be understood that the relays and other appliances for this system of selection may be carried with relays of any other suitable numbers of contacts, although throughout these specifications, they will, for convenience, be known by the common name of "tens relays" and "units relays."

As shown in Figures 2 and 2A of the drawings, each relay is provided with a magnetic circuit which may be that of an electromagnet having a broad pole piece with a suitable magnetic return. The toward pole piece may take the form of a T and the return pole piece may have the form of an interfitting U member comprising side plates 12 and the back-bar 13.

The two-sided magnetic structure is designed to receive on each of its sides, groups of armatures whereby the groups of armatures are acted upon by substantially equal portions of the flux generated in the core and thereby respond in substantially equal acts to equal forces.

As will hereinafter appear, instead of employing two side plates 12 and a back bar 13, the side plates 12 may be integral with each other and provide a generally U-shaped configuration which can be mounted on a separate back bar or other support, as may be desired. Since the members making up the magnetic circuits as herein disclosed are formed of silicon steel, this alternate construction is preferable, in some cases, since it is then unnecessary to construct the back bar 13 of silicon steel. Instead, it may be constructed of other cheaper material.

The T-shaped magnetic member which interfits with the U-shaped magnetic member comprises a pole piece 14 and a core 15. The core 15 comprises the stem of the T and around it is positioned a winding or coil 16 of conventional design. The core 15 may be secured to the back bar 13 and the pole piece 14 by press fits, if it is not desired to provide for ready removal of the coil 16. If it is desired to permit ready removal of the coil 16, then the pole piece 14 should be arranged to be readily detached from the core 15 or the core 15 should be arranged to be readily detached from the back bar 13.

The pole piece 14 is of such material and dimensions with relation to the U-shaped member, the core 15 and the coil 16 that the flux generated by the coil is as nearly as possible equally distributed between the two sides of the pole piece and throughout the length of each side.

It will be observed that air gaps 17 are provided between the ends of the U-shaped magnetic member formed by the side plates 12 and the back bar 13 and the ends of the top of the T-shaped magnetic member formed by the pole piece 14 and the core 15. These air gaps are preferably about $\frac{3}{32}$ inch long. However, these air gaps bear a certain necessary relation to the size and material of the armatures and their proximity to the pole piece, as will be fully described later.

With a view to accurately aligning the side plates 12 of the U-shaped magnetic member with the pole piece 14, clamp plates 20 are provided on opposite sides of the side plates 12 and are secured in position by means of screws 21 which are threaded into the ends of strut members, one of which is shown at 22. It will be observed that the strut members 22 serve not only to provide a clamping action between the upper ends of the clamp plates 20, but also that they serve to space them and the side plates 12 apart.

Positioned on top of the pole piece 14 and common to both of the relays 10 and 11 is an insulating block 23 which is secured in position by screws, one of which is shown at 24, which project through the pole pieces 14 and into the upper threaded end of a strut member 25, the lower end of which is threaded into the back bar 13. The insulating block 23 is preferably formed of mouldable material, such as a thermoplastic. Along the edges of the insulating block 23 are moulded anvil contact members 26 which form the stationary contact members of the relays. The term "anvil" is employed herein to characterize a contact member that is rigidly and firmly mounted and against which another contact member reacts in the manner that a blacksmith causes his hammer to strike his rigidly and firmly mounted anvil. As is shown more clearly in Figure 4 of the drawings, each of the anvil contact members 26 is provided with a reentrant portion 27 about which the material forming the insulating block 23 is moulded to securely grip the anvil contact members in position.

Referring again to Figures 1 and 2 of the drawings, it will be observed that the anvil contact members 26 are provided with extensions 26a, 26b, 26c, 26d, etc. The extensions 26a, 26b, 26d, etc. are arranged in staggered relation of decreasing lengths and their upper ends are turned outwardly as indicated at 28 and notched as indicated at 29. This staggered arrangement of the extensions is provided in order to facilitate connection thereto of paralleling conductors which can then be positioned in coplanar relation. As is described in detail in my copending application, referred to hereinbefore, corresponding extensions 26a of the relays 10 and 11 are connected in parallel circuit relation by a wire which is secured in the notched portions 29 by being spot welded therein.

It will be observed that the upper ends 28 of the extensions 26c are turned inwardly rather than outwardly as is the case respecting the other extensions. This construction is employed since these extensions are not paralleled with any other extension of any other relay in the link. In order to permit the conductors connected to extensions, such as the extensions 26c, with conductors arranged in coplanar relationship, these extensions on the several relays are staggered by having the upper end portions 28 of different heights.

It will also be observed that the extensions 26a, 26b, etc., on one side of the insulating block 23 are offset with respect to the corresponding extensions on the other side. The purpose of this offset relationship will be presently apparent.

The anvil contact members 26 and their extensions are formed of good conducting nontarnishing material such as German silver. In the embodiment of the invention shown in the drawings they are 0.080 inch wide and $\frac{3}{32}$ inch thick. The lengths of course vary depending upon the length of the extension individual thereto.

Individual to each of the anvil contact members 26, there is provided a contact finger which is designated generally at 32. Each contact finger 32 comprises a metallic reed 33 in the form of round wire which has good electrical conducting quality and is highly resilient and corrosion resisting. I have found that stainless steel wire, known as 18-8, and having a diameter of 0.016 inch, is highly satisfactory for my purposes.

Mounted on the upper end 34 of each of the metallic reeds 33 is an armature 35 which serves not only to flex the metallic reed 33 on energization of the winding 16 but also it serves to conduct current between the reed 33 and the associated anvil contact member 26. It is noted that the armatures 35 bridge the associated air gaps 17. The armatures 35 are so mounted with respect to the adjacent edges of the pole pieces 14 that an air gap of 0.032 inch is provided therebetween. It is possible to increase this air gap to 0.053 inch but the smaller air gap is preferable. When the armature 35 has been moved into its alternate position on energization of the coil 16, there is provided a residual air gap between the armature 35 and the adjacent edge of the pole piece 14 of from 0.010 to 0.012 inch. It will then be apparent that the movement of the armature 35 from one position to another is about 0.020 inch.

The armatures 35 are formed of material which not only has good electrical conducting properties but also material which is magnetic. I have found that material known as Alleghany metal No. 4750 is entirely satisfactory for this purpose. Each of the armatures 35 is preferably about 0.478 inch long, about 0.080 inch wide and about 0.0429 inch thick.

The lower ends 33a of the metallic reeds 33 project beyond insulating support members 37. The insulating support members 37 are formed of the same material as the insulating block 23 and, as will hereinafter appear, the metallic reeds 33 are especially prepared so as to make certain that they will be securely held in the insulating support members 37 on completion of the moulding operation.

Referring to Figure 1 of the drawings, it will be observed that the projecting lower ends 33a, 33b, etc., of the metallic reeds 33 extend downwardly through the same distances. It will also be observed that the lower ends 33a, 33b, etc., on one side of the relay construction are offset with respect to the corresponding lower ends 33a, 33b, etc., on the other side. This arrangement is provided in order to permit the coplanar arrangement of cross connecting conductors between corresponding tens relays of adjacent links as is described more fully in my copending application, referred to hereinbefore. The cross connecting conductors are secured by suitable means, such as welding, to the lowermost portions of the projecting lower portions 33a, 33b, etc. Since these projecting portions are staggered, the cross connecting conductors can obviously be arranged in a single plane, as described. Since the anvil contact members 26 are arranged in alignment with their respective contact fingers 23, the reason for the offset positions of the anvil contact members 26 on the opposite sides of the insulating block 23 will now be apparent.

The insulating support members 37 in which are moulded the metallic reeds 33 may be secured in position on the back bar 13 by means of screws 38. These screws also serve to carry support members 39 which are arranged to support conductor brackets carrying conductors extending underneath the relays 10 and 11. As is set forth in detail in my copending application, referred to hereinbefore, certain of the downwardly extending ends 33a, 33b, etc., of the metallic reeds 33, are arranged to be connected in parallel in their respective links, while the remaining downwardly projecting end portions are arranged to be cross connected as described.

As shown more clearly in Figures 3, 4 and 5 of the drawings, each of the armatures 35 is provided with an erosion resisting contact member 41 in the form of a short length of round wire. The contact member 41 is preferably formed of good conducting material which will resist erosion due to abrasion and arcing. I have found that round wire formed of palladium is satisfactory for this purpose. A wire having a diameter of 0.020 inch and a length of about 0.070 inch of this material is welded, as shown, across one face of the armature 35 to provide the contact engaging surface thereof.

Each of the anvil contact members 26 is likewise provided with erosion resisting material. As shown, this comprises an insert 42 in the lower end of each of the anvil contact members 26. The inserts 42 may be formed of palladium and are inlaid by conventional means in a strip of German silver from which the anvil contact members and their integral extensions are cut. The insert 42 is preferably about $\frac{3}{32}$ inch wide and about 0.010 inch thick. As indicated at 43 each of the inserts 42 is grooved intermediate its ends so as to provide two distinct points of contact engagement with the generally cylindrical contact member 41 carried by the armature 35. In the event that the alignment between the armature 35 and the anvil contact member 26 is not such as to initially cause both contact engagements to take place, it will be obvious that the armature 35 will be turned slightly due to the pull of the flux generated by the coil 16 so as to cause the two point contact engagement as described.

It is highly desirable that the armatures 35 associated with each side of each of the relays 10 and 11 be accurately aligned so that uniform air gaps are provided between them and the adjacent edges of the pole pieces 14. For this purpose, as shown in Figure 2 of the drawings, the metallic reeds 33 are so arranged that they tend to bias the armatures 35 outwardly to a position beyond the normal open circuit position.

The stop member 44 of suitable, hard, rigid and non-hygroscopic material such as Pyrex glass, is positioned along the armature 35, and is so located that the inherent resilience of the metallic reeds 33 urge the armature into engagement therewith. The glass rods 44 are held in position by means of suitable non-magnetic clamp members 45 which are held in place by the screws 21. It is the common experience in apparatus of the types herein under consideration that the resting anvils upon which spring points, levers and armatures normally rest under more or less pressure are subject to various changes which alter the positions of the resting parts and delay or stop their operation. The metals and some insulating material used yield under the hammering of the return strokes of the parts and alter the position of rest and consequently the operating adjustment. Moisture is deposited upon the surfaces which affects the material chemically, or in the case of sudden lowering of temperature, may actually freeze the parts in their resting position; oxides and impalpable metallic powders form; dust accumulates; the moisture when present consolidates these extraneous materials into adherent scales or adhesive cements, the deleterious action of which is increased as the contacting surfaces are hammered down into close fitting surfaces. These effects disturbing to the operation, vary with temperature, moisture and frequency of operation and require a large factor of safety in the forces required to move the movable part from its resting anvil. In the course of a relatively short period, such parts require cleaning and in the meantime, increasingly frequent and irregular failures of operation may take place. The moving parts—armatures and reeds—in the invention here described, bear upon their resting anvils with slight force, merely enough to fix accurately the position of rest, and are intended to be operated upon by minimum attractive forces, since by these means the energy consumed by the device and the detrimental and destructive effects of the motion are reduced to a minimum and the speed of operation is increased.

The stop-rod 44 of Pyrex or equivalent glass, is straight, inflexible, unchanging under normal temperatures; it is not deformed by the impact of the parts resting upon it; it suffers no chemical change, accumulates no moisture or dust, it changes temperature slowly and does not freeze the armatures; and in no way injuriously affects the metal parts resting upon it. In fact, the operation of the armatures hundreds of millions of times, equivalent to thousands of years of commercial operation, exhibits practically no alteration in the characteristics of operation. It must be assumed that the impact of the returning armature upon the glass rod must expend in heat its energy of motion and must create some vibration; but it is found that the period of vibration is of such high frequency and so brief as to be hardly detectable in a cathode ray oscillograph.

Not only do the glass rods or stop members 44 align the armatures 35 so that uniform air gaps are provided, but also they serve to prevent oscillation of the armatures 35 on the deenergization of the coil 16. As soon as the armatures 35 engage the stop members or glass rods 44 they are immediately brought to rest without vibration or shattering.

It will be noted that leads 46 from the coil 16 are brought out and are connected to metallic reeds 47, wich also extend through the insulating support members 37.

In Figures 6 through 12 are illustrated the steps involved in making up a set or bank of contact fingers 32. Of course, the sequence in which these steps are performed may be varied, the sequence that is set forth hereafter being one that has proven to be highly satisfactory.

The metallic reeds 33 of 18–8 stainless steel should be straight in order to permit assembly into the contact bank in such manner that no adjustments are required once the relay assembly has been completed. As shown in Figure 6, each metallic reed 33 is deformed as indicated at 49 intermediate its ends to provide a flattened portion. The maximum thickness of the flattened portion 49 is preferably about 0.012 inch. The flattened portion 49 is provided in order to prevent turning of the metallic reed 33 after it has been moulded in the insulating support member 37.

The end 34 is then positioned in a slot 50, Figure 7, in the armature 35. The slot 50 is slightly less in depth than the diameter of the metallic reed 33. With a reed of 0.016 inch diameter, the slot 50 has a depth of 0.014 inch, thereby leaving the reed to project above the surface of the armature 0.002 inch to facilitate welding, as will hereinafter appear.

The armature 35 with the end 34 of the metallic reed 33 inserted in the slot 50 is then placed between the jaws 51, Figure 8, of a suitable press which are moved toward each other, as indicated by the arrows in order to deform the walls of the slot 50 about the end 34 of the metallic reed.

Next, as shown in Figure 9, the palladium wire contact member 41 is welded on to the outer end of the armature 35 on the side away from the end 34 of the metallic reed.

Reference has been made heretofore in this specification to the insulating blocks 23 and support members 37 for the contact members and the reed members, respectively, and to the attachment by electric welding of leading-in wires to the contact members and the reeds respectively. Certain relations are desirable or indeed necessary for obtaining the objectives of this invention, between the materials, the structures and the functions which they exercise.

The moulded insulating blocks and support strips are best formed of a thermoplastic material known under the trade name as "Polystyrene." This material is homogeneous, of high insulating properties, of high surface insulation, substantially non-hygroscopic, very little subject to change in dimensions with temperature, hard and strong, and substantially free from cold flow at temperatures below about 165 to 175 degrees Fahrenheit, and free from crazing, shrinkage or cracking at temperatures as low as 70 degrees below zero Fahrenheit. It is free from acid and alkaline substances, and has no perceptible corrosive effect in long periods on any of the metals necessary in the structure hereunder in consideration. It has a melting point between 380 degrees and 410 degrees Fahrenheit, at which temperature it is quite fluid. It can be employed in the injection moulding process at pressures approaching 20,000 pounds per square inch.

Consideration may now be given to the reasons for the materials and structural relations of various features of this invention.

Automatic telephone exchanges must, to obtain the objectives of the inventions in this system, find their places under a great variety of conditions without special treatment or attention, and under these conditions, must perform mechanically and electrically without differences which might affect their action, either within themselves or in their circuit relations with other exchange equipment under other widely varying conditions. For example, some unattended exchanges on this continent must endure winter temperatures as low as 70 degrees below zero Fahrenheit, while the same exchange will reach temperatures of 145 degrees Fahrenheit in summer, or even at the low temperature may be connected with like exchanges at summer temperatures in other regions of the continent. In certain regions, the equipments are subjected to desert dryness throughout the year; in others they are located in places of high humidity throughout the year, and still others may change slowly, or sometimes quickly, from conditions of high humidity depositing films of moisture on their surfaces, to conditions of dryness. Many parts of the switching apparatus are subjected to a constant difference of voltage between adjacent parts amounting to fifty or sixty volts, while the same or other parts are frequently subjected to alternating currents of more than a hundred volts, to inductive discharges up to more than a thousand volts and to frequent lightning discharges reaching three or four hundred volts beyond the lightning arresters. All this variety of heat, cold, humidity and high voltage must leave both the insulating surfaces of the moulded parts and the contiguous metals unchanged, and must leave uninfluenced the electric forces of the line currents in their balanced relations in the system.

I have discovered by long, thorough and exhaustive studies of the various available plastic materials, that Polystyrene best meets the variety of conditions above described for the attainment of the objectives of this invention.

Some of the described characteristics of Polystyrene or allied plastics are, however, inconsistent and incompatible with the ordinarily used structures, processes and techniques employed in the art to which this invention belongs. For example, most varities of telephonic apparatus, particularly relays, switchboards and selective mechanisms for telephone systems are composed of flat metal leaves or springs held between strips of insulating material of Bakelite, micarta or fibre clamped under screws. Polystyrene shatters under such pressures and radical changes of material, design and modes of support are necessary to make use of Polystyrene or like plastics. In other cases, plastics which would support for a short time under normal temperatures, spring pressures held in place by screws or by being moulded in plastic, yield to cold flow under long periods of stress or under relatively high ambient temperatures.

Reference may be made here to certain features of the invention having to do with the attachment of leading-in conductors to the contact-anvils and the reeds. There are two principal reasons for the employment of electrical welding for these attachments, one of which has to do with the nature of the plastic in which the working parts are embedded.

The use of screw binders for central-office telephone exchange equipment was long ago abandoned for the reason that under variance of temperature and under the vibration attending use of the parts, screws gradually work lose over periods of years and the loose connection causes microphonic noises or complete interruption in the voice circuits; but even in the case of screws still firmly set home which, however, make electrical contact in only a few spots, these spots in the course of years, become oxidized or corroded by the passage of the current and fail to maintain the closure of the circuit. Therefore, it has become the universal practice to solder all circuit junctions designed to be permanent. The technique of soldering, however, involves the use of a soldering iron which stores a great deal of heat which it imparts by radiation and by conduction to all bodies in close proximity to it in the process of soldering which requires a considerable period of time. This effect is particularly significant in cases in which, as in automatic switching equipment, it is necessary to solder a large number of connections closely packed together. This amount of heat is sufficient to impair or soften many plastics, including "Polystyrene," which otherwise might be utilized to hold metal parts in position.

In accordance with certain features of the invention herein described, I have made use of electrical spot-welding. The parts to be joined are made very small or so placed as to restrict the flow of heat to the "Polystyrene" supports, and the welding is performed by a brief flash of heavy current—namely, about a half wave of sixty cycle current—between hard metals which makes a permanent and secure joint of small area. This operation can be performed even in very frequent repetition in small areas packed with circuit connections without raising the temperature of the plastic to the point of impairing it or even permitting cold flow of the parts under stress.

Attention is now turned to another requirement attending the use of Polystyrene as a supporting material, having to do with the characteristics of the switching parts of the relay structure which constitute certain other features of the invention in question.

The current carrying parts of relays, mechanical selectors and such mechanism in the field of this invention are universally flat springs relatively wide, closely packed together one above the other in "piles" or edge-by-edge under clamping strips. It is impossible to mould structures of this kind in injection moulds or other moulds into which the plastic is applied either in the form of "dough" to which pressure is applied to force it into the recesses of the mould or in the form of liquid which cools on encountering the relatively cold metal. The hardening plastic distorts the parts, disturbs the intended position of the spring and contact points, or in the case of injection moulding of material like Polystyrene at high pressure, drives the "insert" parts into the farthest corners of the mould.

To realize certain of the objectives of this invention, certain features consist in making the parts, such as the contact-anvils and the reeds, of such form, dimension and material and with such disposition in the finished structure, that the injection moulding of the preferred material can be performed without disturbing the supporting parts (anvils and reeds), displacing the intended accurate positions or imparting stresses in the metal which will redistribute themselves in action with consequent failure of correct position and performance of parts; that is to say, for example, in the reeds embedded in the supporting strip, the reeds are of strong hard metal—nickel-steel; they are of very small diameter, and preferably of round cross-section; the length of reed embedded in the material is relatively short; and they are relatively widely spaced apart, with ample clearance all about them, and of little heat absorbing capacity relatively to the more massive parts of the mould in which they are mounted. As a result of these structures, the "Polystyrene" at a temperature of 420 degrees Fahrenheit, or thereabout, can be injected into the mould at 20,000 pounds per square inch, and the almost liquid material can flow throughout the mould instantly, so freely that the insert parts (the reeds) are not disturbed in their position nor bent. It may be desirable in carrying out variations of the invention to make gates into the mould of such cross-section and so distributed at entry points as to minimize the speed and turbulence of the injection. The material imparts so little heat to the thin reeds in comparison with that which it gives up to the walls of the mould that the resistance of the reeds to flow is not greatly increased, the material hardens first at the walls of the mould and under the elasticity of the reeds, the metal recovers from any slight distortion it may have suffered and the product comes from the mould in correct position, straight and properly spaced with so little undistributed stresses that the structure can be carried through many cycles of 70 degrees below zero to 145 degrees above zero Fahrenheit without perceptible distortion or disarrangement of the working parts.

The required number of contact fingers 32, assembled as described, together with the necessary number of coil connectors 47, are assembled in a suitable mould and the insulating material is moulded in position about the flattened portions 49, as shown in the finished product illustrated in Figures 11 and 12.

It will be observed that two sets of contact fingers 32 for two tens relays form a unitary construction through the use of a single insulating support member 37, to both sets. Obviously the contact fingers can be assembled in single sets, if desired. It will be noted that one end 52 of the insulating support member 37 is notched outwardly while the other end 53 is notched inwardly. This construction permits overlapping of the adjacent ends of adjacent insulating support members of adjacent tens relays so that a single screw can commonly support both of them.

In a preferred construction, insulating support member 37 is 1⁄8" wide. The metallic reeds 33 project above the support a distance of 1²¹⁄₆₄". They project below the insulating support 37 one-half inch. In a typical link assembly certain of the lower projecting portions 33a of the contact fingers 32 will be longer than others in order to provide for longitudinal connection therewith with respect to the link. The other downwardly projecting ends will be of the same length to facilitate cross connections between the links by conductors in coplanar relation as described.

After the contact fingers 32 have been moulded in the insulating support member 37, the armatures 35 are commonly positioned on one electrode 54, Figure 10, of an electric welder. A welding wheel 55 is then moved relative to the armatures 35 so as to successively engage the projecting portions of the ends 34 of the metallic reeds 33. On flow of current between the wheel 55 and the electrode 54 through the metallic reed and armature 35, the latter two are securely welded together as will readily be understood. The reason for having portions of the metallic reeds project above the armatures 35 in the grooves 50 therein will now be more clearly apparent.

In Figures 13 through 18, the details of construction of another relay assembly embodying my invention are disclosed. The particular relay assembly there shown is what is known in the telephone art as a line cutoff and lockout relay assembly. The relay assembly is indicated generally at 60. Its magnetic circuit is formed, as previously described, for the tens relays 10 and 11 by interfitting generally U and T shaped magnetic members. For the relay 60 a one piece generally U shaped magnetic member 61 is provided and is formed preferably of silicon steel. The T shaped magnetic member is formed by a pole piece 62 and a core 63. While only a single U shaped magnetic member 61 is provided, it will be observed that four pole pieces 62 and cores 63 are provided for reasons which will presently be apparent. It will be observed that the upper end 64 of the core 63 projects through the pole piece 62 and is headed over to secure the two members together. The lower end of the core 63 is threaded, as indicated at 65, and projects through a suitable aperture in the base of the U shaped magnetic member 61 and is held in place by a nut 66. This construction facilitates removal of the pole piece 62 and core 63.

The nut 66 on the lower end 65 of the core 63 is located in a suitable aperture 67 in a back bar or support bar 68. The aperture 67 is large enough to admit a socket wrench for tightening or loosening the nut 66. In this construction it is unnecessary to make the back bar or support bar 68 of expensive silicon steel since it does not form a definite part of the magnetic circuit, it being formed instead by the one piece U shaped magnetic member 61.

Any suitable means may be employed for mounting the U shaped magnetic member 61 on to the back or support bar 68. For example, nuts 70 may be welded on the underside of the base adjacent the ends, as indicated more clearly in Figures 14 and 16, and suitable screws 71 may project through apertures in the back bar or support bar 68 into the nuts 70 and through suitable correspondingly tapped openings in the U shaped magnetic member 61.

On each of the cores 63, which form the stems of the T shaped magnetic member, there is provided a coil 74 of conventional type. Connector ears 75 are provided on an insulating ring 76 at the upper end of the coil 74 to permit connection thereto. These ears 75 are apertured as indicated at 77, Figure 13 of the drawings, to facilitate connection thereto.

With a view to accurately aligning the upstanding sides of the U shaped magnetic member 61 and the pole pieces 62, a one piece frame member 78 is provided. The frame member 78 is formed of nonmagnetic metal and is preferably a die casting. The frame member 78 is provided with integrally formed end members 79, Figure 14, having slots 80, Figure 15, therein for interfitting with the ends of the U shaped magnetic member 61. Since the slots 80 can be accurately spaced in the frame member 78, this construction serves to accurately space apart the upwardly extending portions of the U shaped magnetic member 61. For receiving the pole pieces 62, slots 81, Figure 17, are provided in the upper surface of the frame member 78. This construction, together with the fact that the upper ends of the cores 63 are knurled, as indicated at 82, and secured by press fits in suitable apertures in the frame member 78 serves to hold the U shaped magnetic member 61 and the pole pieces 62 in accurate alignment so that air gaps 83 between the ends of the pole pieces 62 and the upper edges of the U shaped magnetic member 61 will be of uniform length and will remain unchanged.

As shown in Figure 17 of the drawings, the frame member 78 is provided with transverse and longitudinal ridges 84 and 85 for interfitting with correspondingly extending grooves in the undersurfaces of an insulating block 86, which is formed of suitable mouldable material, such as Polystyrene or other thermoplastic material. The insulating block 86 may be secured in position on the frame member 78 by means of suitable screws 87. The interfitting ridges 84 and 85 with the corresponding grooves in the underside of the insulating block 86, together with the screws 87, serve to accurately position the insulating block 86 with respect to the frame member 78.

The insulating block 86 is moulded about stationary front contact members 90, which, as shown more clearly in Figure 18 of the drawings, are generally cylindrical in shape. Across one end of the cylindrical contact members 90 there is secured a pair of contact engaging members 91 in the form of round wire. The members 91 may be formed of palladium to provide erosion resisting contact surfaces. At the other end of each of the cylinders or contact members 90, there is secured, as by welding, a connector member 92 which projects upwardly through the insulating block 86 to permit external connection thereto.

Figure 14:
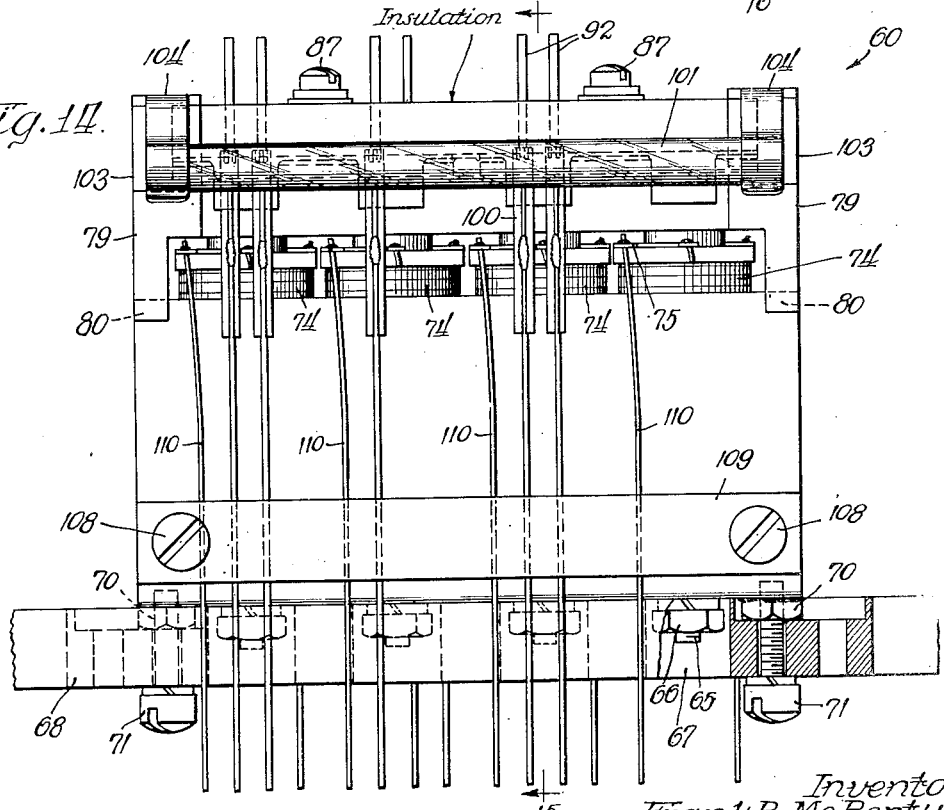
Figure 14 is a view in front elevation of the relay shown in Figure 13, certain parts being broken away in order to more clearly illustrate the details of construction.
Figure 19:
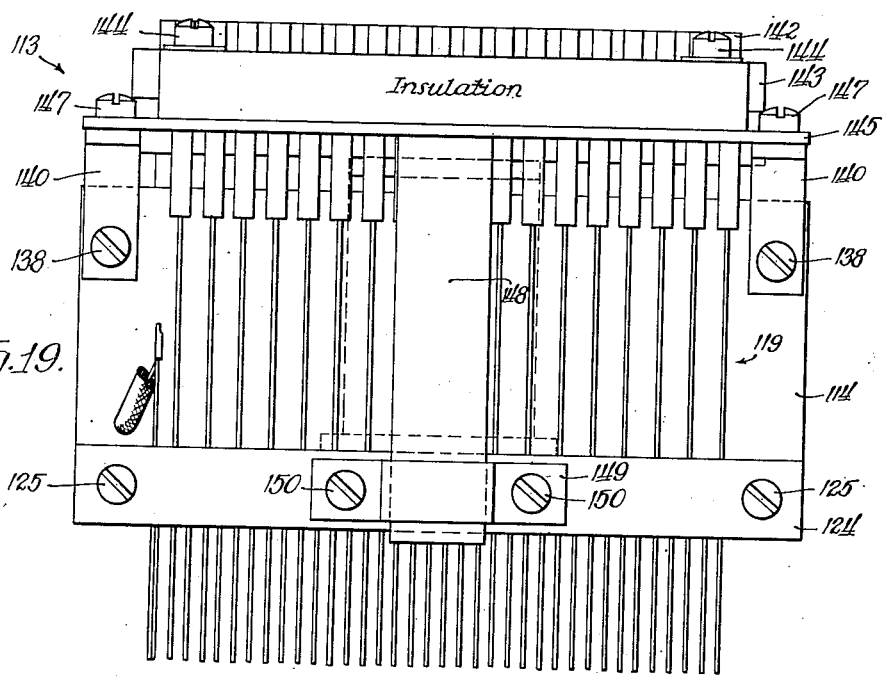
Figure 19 is a view, in front elevation, of still another embodiment of my invention in which permanent magnet means is provided for biasing the movable contact members to one position.

As illustrated in Figures 13 and 14 of the drawings, contact assemblies are provided only in conjunction with the three left hand coils 74. The right hand coil 74 is provided merely for balancing certain electrical characteristics in a talking circuit of a telephone system, as is well known to those skilled in the art.

Associated with each front contact member 90 is a contact finger, shown generally at 94. The construction of the contact fingers 94 is generally similar to that described hereinbefore for the contact fingers 32. Each of the contact fingers 94 includes a metallic reed 95, which carries at its upper end an armature 96 that is secured thereon as previously described. At the upper end of the armature 96 there is provided an insert 97 of erosion resisting material, such as palladium, for contact engagement with the projecting contact members 91 of the front contact member 90.

With a view to providing break as well as make contact members, a contact finger, shown generally at 98, is provided individual to each of the contact fingers 94. Each of the contact fingers 98 comprises a metallic reed 99 carrying at its upper end a contact member 100. When the associated winding 74 is deenergized, it will be understood that the armature 96 is in contact engagement with the contact member 100 so that a circuit therethrough is completed. On energization of the associated winding 74, the armature 96 moves out of contact engagement with the contact member 100 and into contact engagement with the front contact member 90, as will be readily understood.

It is desirable that the armatures 96 be accurately spaced from the ends of the associated pole pieces 62. For this purpose stop members 101, in the form of glass rods, are provided back of each of the contact finger 98, at their upper ends, so that the positions of the contact members 100 thereof are definitely established. The stop members 101 fit underneath projecting shoulder portions 102 at the ends of the frame member 78 and are held therein against endwise movement by integrally formed ears 103, which are flush with the ends of the frame member 78. The stop members 101 are held in position by means of removable spring clips 104, there being a clip at each end of the frame member 78. It will be observed in Figures 15 and 16 of the drawings that the ends of the spring clips 104 are downturned and fit over the adjacent ends of the stop members 101. The spring clips 104 are located in suitable grooves 105, Figure 17, in the end portions of the frame member 78.

As shown more clearly in Figure 15 of the drawings, the metallic reeds 95 and 99 forming parts of the contact fingers 94 and 98 are moulded in suitable insulating support member 107, the individual metallic reeds being flattened as previously described, in order to prevent turning thereof in the support members 107. The support members 107 with the contact fingers 94 and 98 assembled therein are secured in position along the face of the U shaped magnetic member 61 by suitable screws 108, which project through metallic reinforcing strips 109.

In addition to the metallic reeds 95 and 96, which form parts of the contact fingers 94 and 98, there are also provided connector members 110 in the insulating support members 107 for connection to the terminals 75 of the coils 74. It will be observed that the upper ends of the connectors 110 are bent slightly in order to engage one side of the openings 77 in the terminal members 75 of the coils. This provides pressure contact engagement therebetween. In order to insure a good connection, the upper ends of the connectors 110 may be soldered to the terminal member 75, as shown.

Another embodiment of my improved relay construction is illustrated in Figures 19 through 23. The relay construction as shown, generally, at 113, is arranged to provide a plurality of make and break contact engagements. Means are provided for permanently biasing by magnetic means certain of the contact fingers to predetermined position. While a plurality of contact assemblies is shown, it will be obvious that the mangetic biasing feature can be employed in conjunction with a single contact assembly and that it may either be of the make or break type or both.

As before, the magnetic circuit is formed by interfitting generally U and T shaped magnetic members. The U shaped magnetic member comprises side plates 114 and a base plate 115, all preferably formed of silicon steel. The T shaped magnetic member comprises a pole piece 116 from which depends a core 117 that interfits with the base member 115. A coil or winding 118 of conventional design is provided around the core 117 as shown, as shown in Figure 20A.

Along each side of the side plates 114 are provided several contact fingers, designated generally at 119. As before, the contact fingers are moulded in insulating support strips 120 and each comprises a metallic reed 121 carrying at its upper end an armature 122 formed thereon as previously described. At their upper ends the armatures 122 are provided with erosion resisting contact members 123, which may be formed of round palladium wire and welded in place.

The insulating support strips 120 carrying the contact fingers 119 have provided therewith metallic clamp strips 124, together with which they are secured by suitable screws 125 to opposite sides of the base member 115.

Mounted on top of the pole piece 116 is an insulating block 128 of suitable mouldable material which is secured in position by suitable screws 129. Anvil contact members 130 are moulded, as previously described, along the edges of the insulating block 128. The anvil contact members 130 are provided with metallic inserts 131, preferably of material such as palladium, and are centrally grooved to provide two point contact engagement with the contact members 123 carried by the armatures 122. Conductors 132 may be secured to the upper ends of the anvil contact members 130 by any suitable means, such as welding, to permit external connection thereto.

Figure 20:
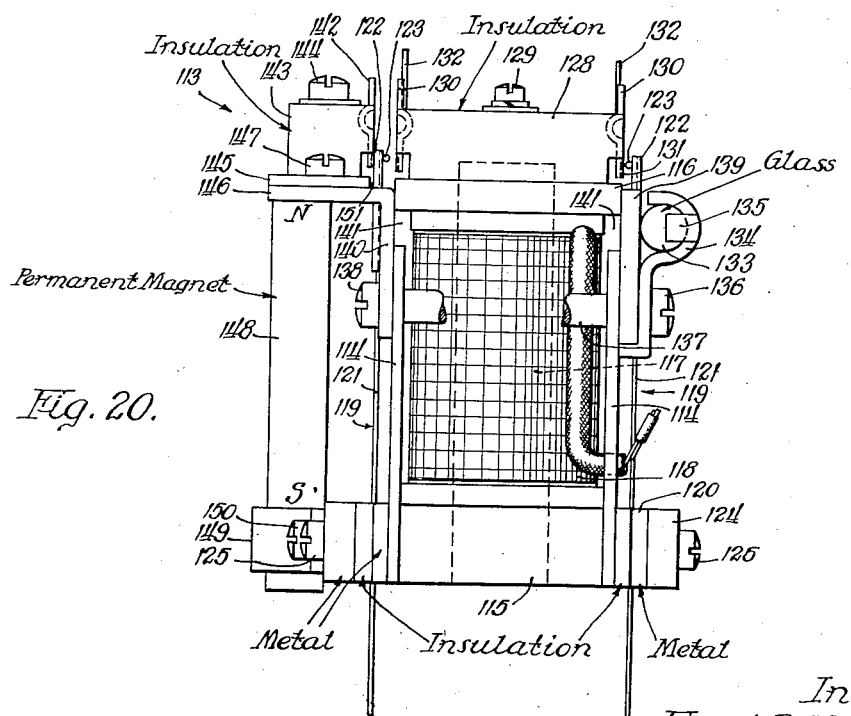
Figure 20 is a view, in end elevation, of the relay construction shown in Figure 19.

As shown in Figure 20, the contact fingers 119 on the right hand side of the relay 113 are held in alignment by a stop member 133 in the form of a glass rod, which is so positioned that the inherent resiliency of the metallic reeds 121 urges the armatures 122 carried thereby into firm engagement therewith when the coil 118 is deenergized. The stop member 133 is secured in position by means of suitable nonmagnetic clamp members 134 each of which has an integrally formed ear 135 for preventing endwise movement of the stop member 133. The clamp members 134 are secured in position by means of screws 136 which project into the ends of spacers 137, the other ends of which are adapted to receive screws 138.

It will be observed that the spacers 137 are positioned between the side plates 114 and serve to accurately space them apart. Platelike clamp members 139 on the right hand side of the relay 113, as shown in Figure 20, and L shaped clamp members 140 on the left hand side are also held in position by the screws 136 and 138 and in engagement with opposite sides of the pole piece 116. It will be observed that this construction serves not only to accurately space the side members 114 of the U shaped magnetic member apart, but also that it serves to accurately position with respect thereto the sides of the pole piece 116 so that the air gaps 141 between the ends of the top of the T shaped magnetic member or the sides of the pole piece 116 are spaced uniformly from the upper ends of the U shaped magnetic member or from the upper edges of the side plates 114.

The construction of the relay 113 as thus far described relates to the provision of a plurality of make contact engagements that are completed when the coil 118 is energized. Associated with the contact fingers 119 on the left hand side of the relay 113, as viewed in Figure 20, is a group of anvil contact members 142, there being one individual to each armature 122 and normally engaged thereby when the coil 118 is deenergized. The anvil contact members 142 are secured by moulding in a suitable insulating member 143 of mouldable material that is secured by suitable screws 144 onto a plate 145 of magnetic material, such as silicon steel. The ends of the plate 145 are carried by the outwardly projecting portions 146 of the clamp members 140, and are secured in position by screws 147.

When the coil 118 is deenergized, the inherent resiliency of the metallic reeds 121 is such as to urge the armatures 122 carried thereby into contact engagement with their associated anvil contact members 142. This contact engagement is likely to involve chattering and resulting arcing when the coil 118 is deenergized. Of course, it is possible to so arrange the contact fingers 119 that a relatively great force will be exerted to prevent such chattering. It may be undesirable to do this however.

With a view to biasing the contact fingers 119 associated with the anvil contact members 142, a permanent magnet 148 is provided in the form of a bar, the upper end of which abuts the underside of the plate 145. The lower end of the permanent magnet 148 is secured by means of a suitable clamp 149 and screws 150 to the clamp plate 124 on the left hand side of the relay 113.

It will be understood that the permanent magnet 148 in cooperation with the plate 145 of magnetic material serves to bias the armatures 122 into contact engagement with their respective anvil contact members 142. A slight air gap 151 is provided between the armatures 122 and the adjacent edge of the plate 145 so as to prevent sealing of the armatures thereto. On energization of the coil 118, the biasing force of the permanent magnet 148 is overcome and the armatures 122 are attracted toward the pole piece 116 to move into contact engagement with their respective anvil contact members 130.

On deenergization of the coil 118 the contact fingers 119 resume their normal deenergized positions. The group of contact fingers 119 on the left hand side of the relay do this under the combined influence of the inherent resiliency of their metallic reeds 121 and the attractive force of the permanent magnet 148. As a result substantially no chattering and resulting arcing takes place between the armatures 122 and their associated anvil contact members 142.

By employing the straight line contact member construction with little or no overlapping, the capacity of the circuits through the relays constructed as disclosed herein is substantially reduced as compared to the overlapping contact member construction of the prior art employing twisted pairs of wires for making connections thereto. This is of distinct advantage in conjunction with high frequency circuits since very little distortion is caused in them when they are carried through the contact members of the relays constructed according to this invention.

The mass of the armatures as compared to the attractive force exerted on them by the windings is relatively small so that the armatures are firmly held in the circuit closed positions. Substantially no vibration of the armatures occurs either on the initial energization of the windings or afterwards. As a result talking circuits through the contact members of these relays are exceptionally quiet.

It will be observed from the foregoing description that the selection and switching relays of this invention present amongst others the following characteristics: instead of the construction universally employed in which a moto-magnet is provided with armatures connected through various intermediate mechanical linkages with switching levers or springs to move them, which require insulation, accurate positioning, relative adjustment, the switching members here described are operated directly by the magnetic forces with no intervening parts; are brought to and retained in position only by the magnetic forces; can be constructed with such uniformity that all act alike and simultaneously; that there are no possibilities of adjustment or of change in position or operating characteristics.

The switching parts individually are of very small mass and hence can be operated with slight power with high speed, the members being subject only to its own inertia, momentum and destructive impact, dissociated from the other members of the group.

It uses the fewest possible parts for construction, maintenance and operation.

The retractal force required for operation is a minimum and therefore the attractive force also can be a minimum.

The fractional flux apportioned to each switch armature is applied fully and directly to the closure of the contact upon its anvil.

Because of these characteristics, a minimum operating power and current values are required, the currents and energy dissipations at the multitude of switching points required in the operation of the complete system are very greatly diminished, to a minimum, and the cost, deterioration, failure and repair are reduced to a point where uniform, certain operation can be expected throughout many years.

Since certain further changes may be made in the foregoing described constructions and different embodiments of the invention can be made without departing from the scope thereof, it is intended that all matter contained in the above description or shown in the accompanying drawings shall be interpreted as illustrative and not in a limiting sense.

I claim as my invention:

1. In a relay for switching central exchange telephone circuits, the combination of a vertical magnet core having a magnetizing coil, an upper polepiece extending laterally from the top of the core to a point outside the radius of the coil and having a substantially straight edge, a magnetic plate lying substantially parallel to the axis of the core and disposed outside the radius of the coil, a magnetic extension from the lower end of said plate to the lower end of the core, the upper edge of said plate lying adjacent to but spaced vertically from the straight edge of said upper pole piece by an air gap, a transverse bar of insulation extending along the lower end of said plate and clamped thereto, a plurality of substantially vertical wire reeds fixed in and extending above and below said bar in substantially parallel relation to each other and to said plate, magnetic bars constituting armatures fixed to the upper ends of said reeds and extending across and above the air gap, contacts carried on said armatures, an insulating contact support mounted on said upper pole piece and bearing stationary contact members for cooperation with the contacts on said armature, said contact members having vertically extending terminals.

2. In a relay a first polepiece comprising a horizontally extending magnetic bar, a second polepiece comprising a vertically disposed magnetic plate and a horizontally disposed extension below the first polepiece, the lateral edge of the bar and the top edge of the plate defining between them a parallel sided air gap disposed in a vertical plane, a wound magnetic core joining said polepieces, an insulating bar supported on said first polepiece, contact members partially embedded in said insulating bar and having vertically extending terminals and horizontally facing stationary contact points, a plurality of reeds bearing individual magnetic armatures, said armatures extending across the gap and overlying said contact members and having contact points adapted to engage the contact points of the latter when the core is magnetized and the armatures are attracted, an insulating bar embracing said reeds intermediate their ends and fixedly mounted on said second polepiece remote from the air gap, the lower ends of said reeds extending below the second polepiece to provide terminals.

3. In a relay, the combination of a magnetic frame comprising a central straight magnetizable core, polepieces connected to the ends of the core and providing an air gap lying in a plane substantially parallel to the longitudinal axis of the core and disposed adjacent one end of the core, an armature reed disposed in a plane substantially parallel to the plane of the air gap, a transverse bar of insulation moulded upon the reed intermediate its ends, and fixedly supporting the same, said bar being supported in fixed relation to the magnetic frame, an armature bar fixed upon the end of the reed longitudinally of the reed and extending over said air gap, said armature bar having a transverse contact rod welded to the face of the armature bar near its outer end, a stationary contact member in position to be engaged by said contact rod, a bar of insulation moulded about a part of said stationary contact member and being supported rigidly on the magnetic frame adjacent the air gap, said stationary contact member comprising two parallel projecting contact ridges transverse to said contact rod and adapted to be engaged by said contact rod.

4. A multiple circuit controlling relay comprising a vertically extending core, an energizing winding on said core, an upper polepiece comprising a straight flat bar of oblong cross section having one edge face disposed at one side of the core, a lower polepiece comprising a vertically extending plate terminating at its upper end adjacent the edge face of the upper polepiece and forming therewith an air gap, a row of straight wire reeds disposed in substantially a vertical plane, each of said reeds having affixed upon its upper end a narrow armature bar bearing at its upper end a contact point, said armature bars overlying the air gap with the contact point disposed above the upper polepiece, a bar of insulation embedding said row of reeds intermediate their ends to hold the reeds fixedly in position, said bar being mounted upon the lower end of said plate, the lower ends of said reeds extending below the lower polepiece to provide terminals individual to the reeds, a plurality of rigid individual stationary contact members having contact points lying in a vertical plane and facing the contact points on said armatures, a bar of insulation embedding portions of the contact members to hold them fixedly in position relative to each other, said bar being mounted rigidly upon the upper polepiece, said rigid stationary contacts forming front stops for the armature bars to hold the contact bars out of contact with the polepieces.

5. The relay of claim 4 having a permanent bar magnet disposed at one side of the channel and clamped thereto at its lower end, a transverse polepiece disposed substantially parallel to said upper polepiece and lying back of the armatures on the corresponding side of the polepiece, a bar of insulation mounted on said transverse polepiece, said latter bar having individual back contact members partially embedded in the body of the bar with contact points lying substantially in a vertical plane parallel to the plane of the front contacts on the same side of the channel, said transverse polepiece being polarized by the upper end of said bar magnet to attract and hold the adjacent armatures against the corresponding back contacts.

6. A relay comprising in combination a channel shaped polepiece, a magnetic bar of substantially the same width as the channel disposed above the channel and forming a cooperating polepiece separated from the edges of the channel by an air gap at each side of the bar, a magnetizable core joining the bar and the bottom of the channel, a winding on said core, an armature structure on each side of the channel, each armature structure comprising thin reeds mounted intermediate their ends in insulated relation upon the side of the channel, and armature bars mounted upon the free ends of the reeds and overlying the air gaps, said armature bars bearing contact points, and stationary contact members mounted in insulated relation upon said magnetic bar polepiece in register with the armature bars and having cooperating contact points.

7. A multi-circuit-controlling relay comprising in combination a channel shaped lower polepiece, an upper polepiece comprising a magnetic bar of substantially the same width as the channel shaped polepiece disposed above and spaced from the edges of the channel by parallel air gaps along each edge of the bar, a magnetizable core joining the bar and the bottom of the channel, a winding for the core, a multiple armature structure on each side of the channel each armature structure comprising a series of straight wire reeds lying in a plane parallel to the axis of the core, each armature structure comprising a bar of insulation embedding the reeds of said armature structure intermediate their ends, each bar being attached to the lower end of the lower polepiece to hold the embedded reeds fixedly in position, individual armature bars mounted on the upper ends of the reeds, said bars extending across the corresponding air gaps and having contact points lying above the upper polepiece, a second bar of insulation clamped upon the upper polepiece, stationary contact members partially embedded on each side of the bar, said stationary contact members having points registering with the corresponding contact points of the armature bars, vertical extensions of the stationary contact members lying in parallel planes above the second bar of insulation, said extensions having laterally extending terminal lugs lying on successive levels and terminating in parallel vertical planes.

8. In a multi circuit controlling relay, a series of straight wire reeds having localized flat spots at corresponding points intermediate their ends, a bar of insulation molded upon said wires about the flat spots and holding said wire reeds rigidly against endwise and angular displacement and in a common plane parallel to each other, the lower ends of the reeds extending below the bar to provide integral electrical terminals, individual armature bars fixed rigidly upon the outer ends of the reeds, said armature bars having flat front faces disposed substantially in a common plane, each of said armature bars having a contact member comprising a single transverse ridgelike contact projection, a row of cooperating stationary contact members having free faces disposed substantially in a common plane parallel to the plane of the armature bar faces, said stationary contact members having each a pair of ridgelike contact projections disposed substantially parallel to the length of the wire reeds, and being adapted to be engaged crosswise by the transverse ridgelike projection of the contact members on the outer ends of the armatures, and an electromagnet having parallel polepieces disposed transversely of said armature bars and adapted to attract simultaneously said armatures upon energization of said electromagnet.

9. A relay of the class described comprising two parallel rows of coplanar stationary contact terminal conductors having contact bearing portions at their inner ends, said portions having contact points, the conductors of each row being of graduated length and having at their outer ends laterally extending lugs whereby connection with the lugs of each row may be made with a corresponding set of coplanar parallel multiple conductors, the plane of each set being substantially parallel to the plane of the corresponding row of contact terminal conductors, a bar of insulation embedding portions of said contact terminal conductors to hold the same in fixed relation, a relay frame member of non-magnetic material extending longitudinally of said bar of insulation, a bar shaped polepiece disposed between said bar of insulation and said relay frame member, two parallel rows of coplanar flexible wire reeds, each row lying outside the corresponding row of contact terminal conductors, said reeds having on their inner ends oblong magnetic armatures with flat sides facing the edge of the polepiece and being adapted to be attracted toward said polepiece upon magnetization of the same, said armatures having contact points at their ends overlying the corresponding stationary contact points for engaging with the same, each row of reeds being supported in a bar of insulation extending transversely of the reeds intermediate their ends, the outer ends of the reeds constituting terminals adapted to make connection with a set of coplanar multiple conductors, a pair of platelike polepieces disposed parallel to each other and to the rows of reeds, said polepieces extending under the armatures of each row of reeds and being spaced at their inner ends from the adjacent edges of the first polepiece by an air gap, and a wound magnet core connected between said first polepiece and said pair of polepieces for energizing said polepieces to attract all of said armatures simultaneously.

10. The relay of claim 9 wherein said non-magnetic frame has flanges at its ends, said flanges engaging the said pair of platelike polepieces to hold the adjacent edges in fixed relation to the edges of the bar shaped polepiece.

11. The relay of claim 9 wherein said non-magnetic frame has heads at its ends, said heads engaging the adjacent edges of said pair of platelike polepieces to hold the adjacent edges in fixed relation to the edges of the bar shaped polepiece, a glass rod forming a fixed backstop for each row of armatures, each rod having its ends resting on the adjacent sides of said heads, and resilient clamping means for clamping the ends of the rods against said heads.

12. The relay of claim 9 wherein said non-magnetic frame has heads at its ends disposed beyond the ends of the bar shaped polepiece, a pair of glass rods each forming a fixed backstop for the adjacent row of armatures, each rod having its ends resiliently clamped against the adjacent sides of the heads.

13. A multiple relay of the class described, comprising two parallel rows of coplanar stationary contact terminal conductors having contact bearing portions at their inner ends, said portions having contact points, the conductors of each row being of graduated length and having at their outer ends laterally extending lugs, said lugs of each row having their ends lying in a plane offset from and parallel to the plane of the corresponding row of conductors, a bar of insulation embedding portions of said contact terminal conductors of each row to hold said conductors and contact points in fixed relation, a relay frame member of non-magnetic material extending longitudinally of said bar of insulation and having a plurality of transverse recesses, bar shaped magnetic polepieces disposed in said recesses and having their opposite ends lying in substantially parallel planes, wound magnet cores individual to said polepieces, two parallel rows of coplanar straight wire reeds, each row lying outside the corresponding row of contact terminal conductors, certain ones of said reeds having on their inner ends oblong magnetic armatures with flat sides facing the end faces of said polepieces, said armatures having contact points at their ends overlying the corresponding stationary contact points for engagement with the same, each row of reeds being supported in a bar of insulation extending transversely of the reeds intermediate their ends, the outer ends of the reeds constituting terminals lying in the plane of the row, a pair of platelike polepieces disposed parallel to each other and to the rows of reeds, said polepieces extending under the armatures of each row and being spaced at their inner ends from the adjacent edges of said bar shaped polepieces by air gaps, and magnetic means connecting said pair of platelike polepieces in common to the adjacent ends of said wound magnet cores.

14. The relay of claim 13 wherein certain others of said reeds of each row are connected at their inner ends to said windings of said cores, said connections extending over the inner edge of said platelike pole pieces.

15. The relay of claim 13 wherein a second row of coplanar wire reeds is supported in each reed supporting bar of insulation, the reeds of the second row on each side bearing at their inner ends individual contact elements engaging the corresponding armatures of the first row of reeds to provide back contact for the same.

16. In a telephone type relay having a magnetic core provided with a flat platelike polepiece providing a common air gap for operating a plurality of armatures simultaneously in multiple, one of said polepieces comprising a flat platelike member, an armature structure comprising a plurality of straight wire reeds lying in a common plane, said reeds having distortions at corresponding points intermediate their ends, oblong magnetic armature members fixed upon the upper ends of the reeds and lying in close proximity to the edge of said platelike polepiece member, and a flat transverse straight bar of oblong cross section of rigid insulation moulded upon said reeds intermediate their ends and completely embedding the said distortions to hold the reeds rigidly and permanently straight and to prevent endwise and angular displacement of the reeds in the bar, said reeds extending transversely through the bar in the direction of its longer cross sectional dimension, and a flat clamping bar secured to said one polepiece, said flat bar of insulation being fixedly clamped under said clamping bar against said polepiece, the plane of said reeds being parallel to the plane of said flat platelike member.

17. The relay of claim 16 having a permanent bar magnet mounted rigidly on the frame at its lower end, a polepiece for said permanent magnet comprising a magnetic bar disposed back of said armatures and being polarized by the upper end of said bar magnet to hold the armatures away from said stationary contacts.

18. The relay of claim 16 having a transverse magnetic bar disposed back of said armatures, back contact members individually registering with said armatures, and a permanent bar magnet disposed parallel to the core and having its upper end in magnetizing relation to the transverse magnetic bar to polarize the same, said magnetic bar constituting a polepiece for attracting the armatures and holding them against said back contacts.

19. In a relay the combination of a relay armature structure comprising a bar of magnetic material, a flexible reed of spring metal fixed to the back of said bar, a short transverse bar of contact metal of small diameter welded to the front face of said bar, and constituting a contact member, a body of rigid insulation moulded about said reed intermediate its ends, said reed having a keying portion completely embedded in said moulded body, said reed being of substantially uniform cross section throughout except at said keying portion, a stationary contact member having a pair of contact ridges disposed crosswise of and in register with the cooperating bar of contact metal on the armature, and a magnet for pulling the armature into engagement with the stationary contact, said reed being capable of twisting to insure double point engagement between said bar and said ridges.

20. A multiple contact relay of the telephone type comprising a series of straight wire reeds disposed in parallel substantially in a common plane, a thin flat common supporting bar of insulation of oblong cross section moulded upon the reeds intermediate their ends, the reeds below said bar providing terminals, individual magnetic armatures mounted upon the upper ends of said reeds, an electromagnet having a magnetic frame comprising a core and polepiece structure providing a common magnetic air gap for said armatures for attracting said armatures in unison, clamping means for clamping said bar flat against said magnetic frame, and a common backstop for said armatures comprising a round glass rod lying substantially parallel to the air gap and disposed adjacent the outer ends of the armatures, and yielding clamp means engaging the ends of the rod for holding the rod in fixed relation to the magnetic frame.

21. The relay of claim 20, wherein a second series of wire reeds is mounted in the said bar of insulation in a common plane parallel to the plane of the reeds of the first series, individual contact members carried on the upper ends of said reeds of the second series and interposed between the corresponding armatures of the reeds of the first series and the glass rod backstop, said contact members providing back contacts for the corresponding armatures.

FRANK R. McBERTY.